United States Patent [19]
Breunsbach

[11] 3,788,353
[45] Jan. 29, 1974

[54] NOZZLE

[75] Inventor: Maurice C. Breunsbach, Hamburg, N.Y.

[73] Assignee: Spirolet Corporation, North Tonawanda, N.Y.

[22] Filed: Apr. 24, 1972

[21] Appl. No.: 247,207

Related U.S. Application Data

[62] Division of Ser. No. 7,747, Feb. 2, 1970, Pat. No. 3,692,243.

[52] U.S. Cl. .............................. 137/604, 239/417
[51] Int. Cl. ............................................. F16k 19/00
[58] Field of Search . 137/604; 239/416, 416.5, 417, 239/417.3, 398

[56] References Cited
UNITED STATES PATENTS

| | | | |
|---|---|---|---|
| 3,470,826 | 10/1969 | Foulds | 137/604 X |
| 371,158 | /1887 | Wright | 137/604 |
| 3,104,826 | 9/1963 | Morris | 239/417 X |
| 3,540,474 | 11/1970 | Sharples | 137/604 X |

FOREIGN PATENTS OR APPLICATIONS

| | | | |
|---|---|---|---|
| 603,869 | 1/1926 | France | 239/398 |
| 1,170,934 | 9/1958 | France | 239/398 |

*Primary Examiner*—Robert G. Nilson
*Attorney, Agent, or Firm*—Edwin T. Bean, Jr.

[57] ABSTRACT

An elongated hollow body formed of a resiliently yieldable material having a bore therethrough. A thread formation of helical configuration is formed in the bore and the bore tapers gradually toward its outlet end. Passages formed in the inlet end of the nozzle are variable in size to control the rate of liquid flow into the bore.

6 Claims, 14 Drawing Figures

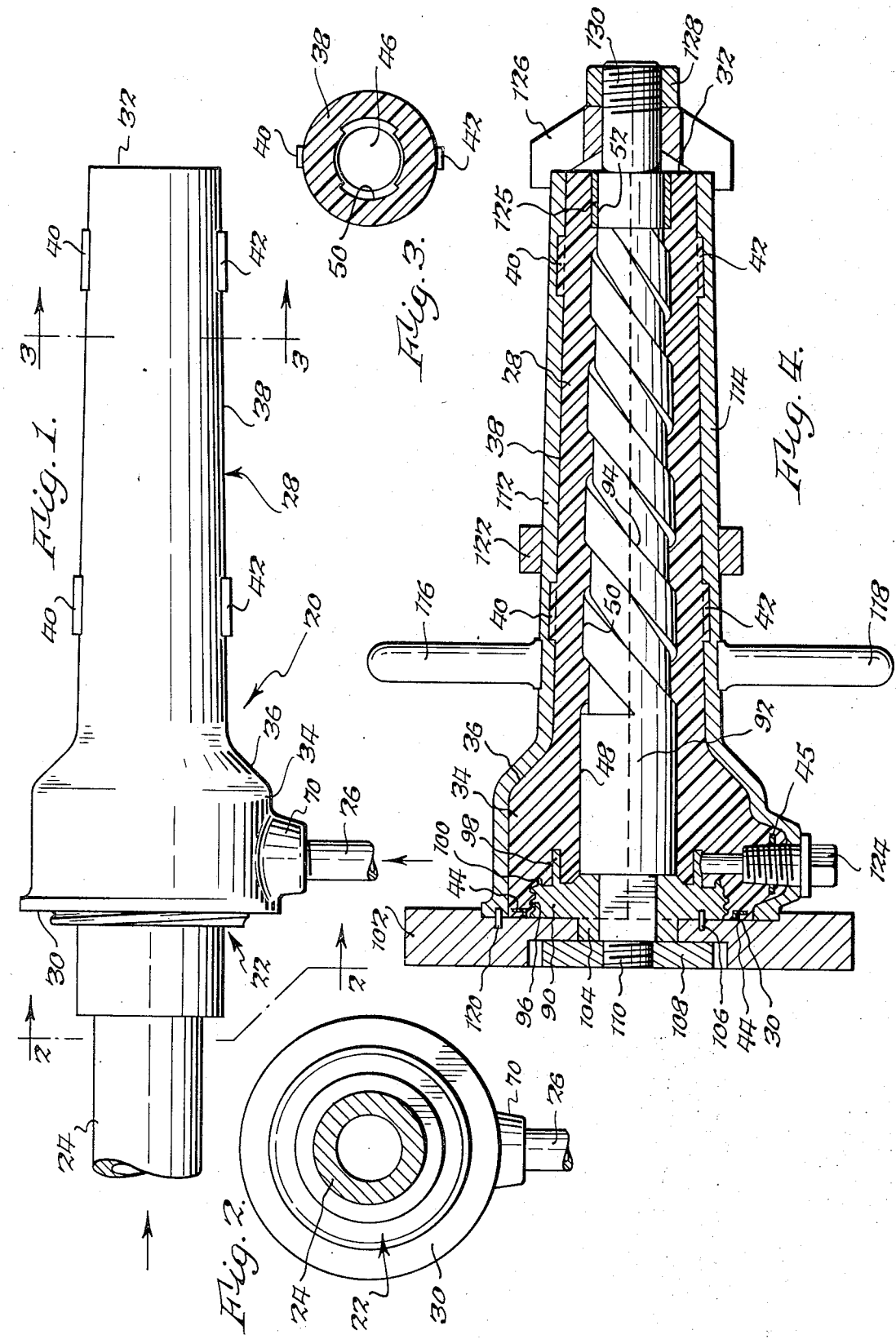

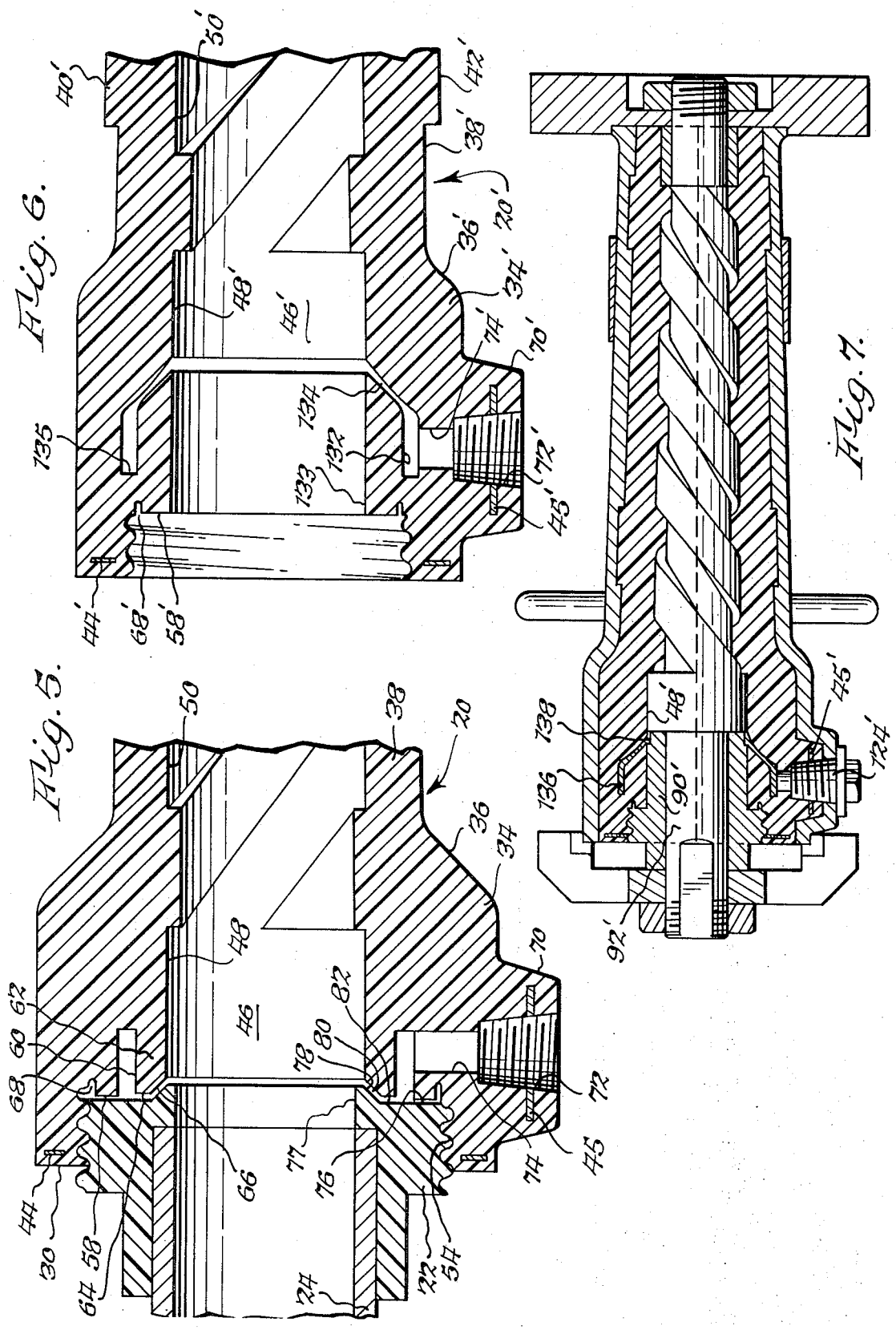

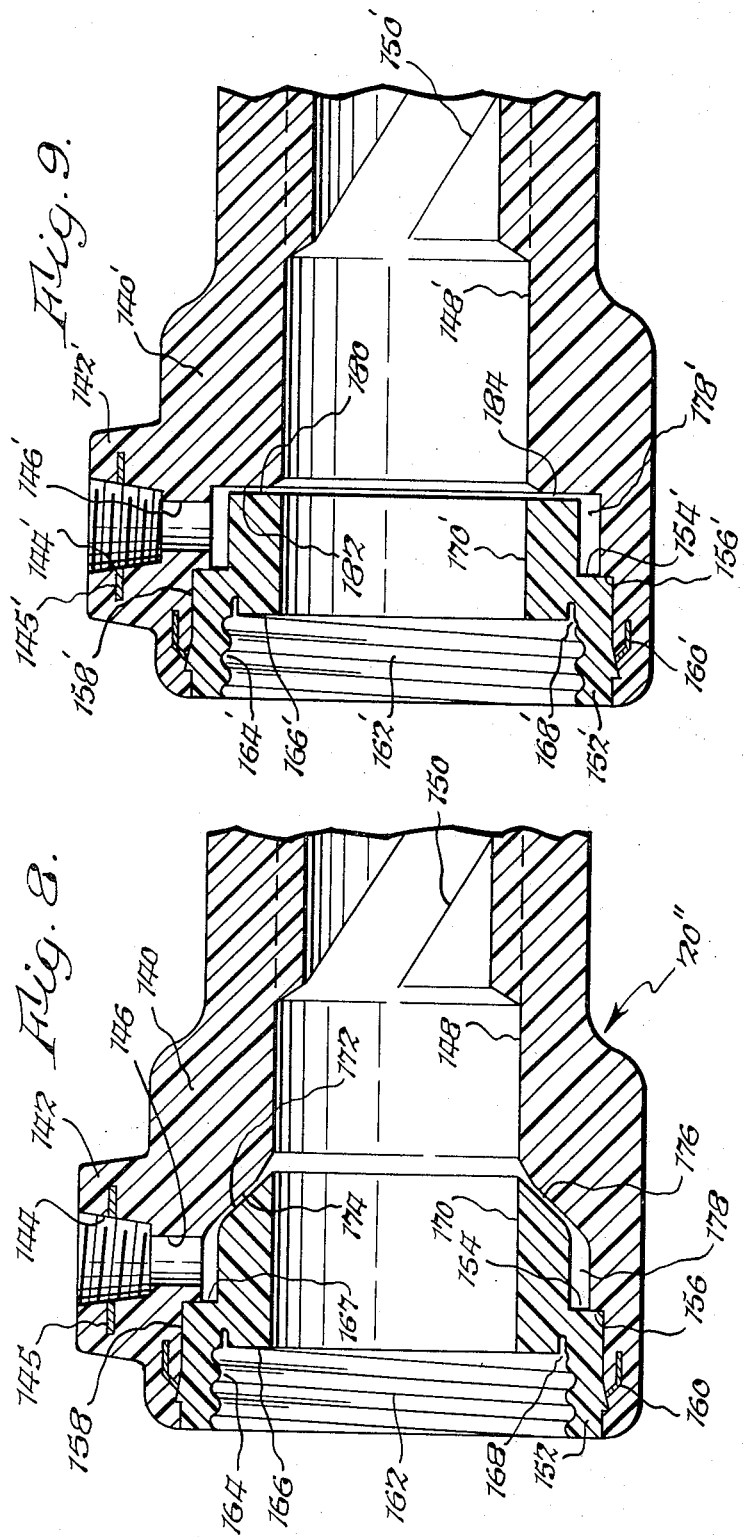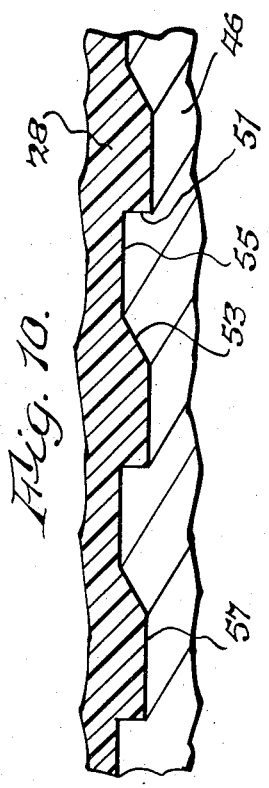

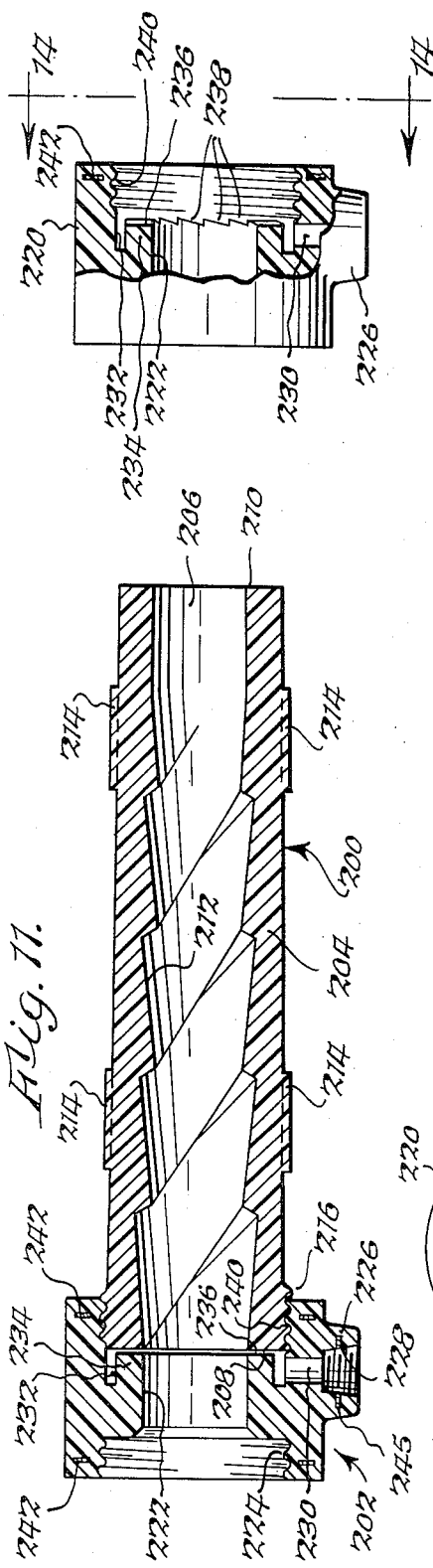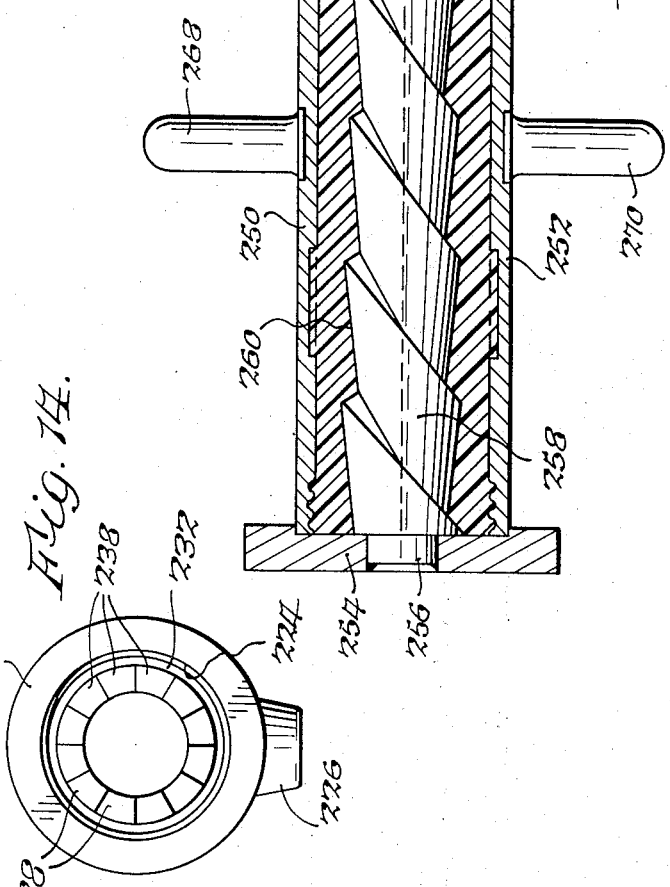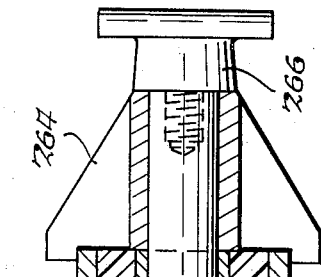

NOZZLE

This application is a division of application Ser. No. 7747 filed Feb. 2, 1970 now U.S. Pat. No. 3,692,243.

BACKGROUND OF THE INVENTION

This invention relates to nozzles and, more particularly, to nozzles for "cement guns" used in handling cementitious materials.

In cement guns a mixture of cementitious material in dry particle form is pneumatically blown through a metal nozzle which can have a rubber lining. In its passage through the nozzle, water is introduced transversely into the stream of dry material and mixed therewith to form a wet cementitious material which issues through the nozzle as a high velocity stream to be directed upon a background surface. In this manner, the cementitious material is pneumatically impacted against the surface to form a dense cementitious mass. One use for such cement gun nozzles is in applying a linging to the refractory walls of a high temperature furnace.

A tremendous amount of static electricity is generated during the spraying or blowing operation when using conventional nozzles, requiring careful grounding procedures. Moreover, they are susceptible to wear caused by the abrasive action of the material passing through the nozzle. Also, the wet mixture issuing from these nozzles tends to spread, making accurate application extremely difficult and resulting in excessive wastes of the mixture and contamination of the ambient atmosphere. Furthermore, proper mixing is not always obtained when using conventional nozzles. Unless a thorough mixing of the cement ingredients and water is effected, there is an excess of "rebound", a term commonly used to designate that portion of the cementitious material which does not adhere to the background surface, but instead is reflected and lost.

SUMMARY OF THE INVENTION

It is an object of the present invention to provide a cement gun nozzle which effectively overcomes the above-noted disadvantages.

It is another object of this invention to provide the foregoing in a nozzle which is competitive in cost, durable and dependable in operation, and easy to use.

It is a further object of the present invention to provide the foregoing nozzle with improved liquid flow control means to realize a consistent and uniform mixture.

In one aspect thereof, the cement gun nozzle of this invention is characterized by being formed in its entirety of a plastic resiliently yieldable material, preferably formed of but not restricted to urethane. The bore of the nozzle is provided with a thread formation of a generally helical pattern to impart a spiral twist or rifling motion to the mix as it passes through the nozzle. Also, the bore tapers slightly toward the outlet end to choke the material issuing from the nozzle and prevent spreading. Resiliently yieldable passages are formed in the inlet end of the nozzle for adjusting the sizes thereof to control the rate of liquid flow into the bore of the nozzle.

The foregoing and other objects, advantages and characterizing features of the present invention will become clearly apparent from the ensuing detailed description of certain illustrative embodiments thereof, taken together with the accompanying drawings wherein like reference characters denote like parts throughout the various views.

BRIEF DESCRIPTION OF THE DRAWINGS

FIG. 1 is a side elevational view of a nozzle of the present invention, shown attached to a material conveying conduit;

FIG. 2 is a vertical sectional view taken about on line 2—2 of FIG. 1;

FIG. 3 is a vertical sectional view taken about on line 3—3 of FIG. 1;

FIG. 4 is a longitudinal sectional view of the nozzle of FIG. 1 shown in the mold employed for forming such nozzle;

FIG. 5 is a fragmentary sectional view, on an enlarged scale, showing a hose coupling connected to the inlet end of the nozzle of FIG. 1;

FIG. 6 is a fragmentary sectional view of a second form of nozzle of this invention;

FIG. 7 is a longitudinal sectional view, on a reduced scale, of the nozzle of FIG. 6 shown in a mold for its formation;

FIG. 8 is a fragmentary sectional view of a third form of nozzle of this invention;

FIG. 9 is a fragmentary sectional view of a fourth form of nozzle of this invention;

FIG. 10 is a fragmentary, longitudinal sectional view of a nozzle depicting a thread formation in the bore thereof common to the forms of nozzles shown in FIGS. 1, 6, 8 and 9;

FIG. 11 is a longitudinal sectional view of still another form of nozzle of this invention shown attached to a liquid injecting adaptor;

FIG 12 is a longitudinal sectional view of the nozzle of FIG. 11 shown enclosed in a mold;

FIG. 13 is a side elevational view, partially in section, of the liquid injecting adaptor of FIG. 11; and FIG. 14 is an end elevational view of the liquid injecting adaptor of FIG. 13 looking in the direction of arrows 14—14.

DETAILED DESCRIPTION OF ILLUSTRATIVE EMBODIMENTS

Referring in detail to the drawings, there is shown in FIG. 1 a presently preferred form of nozzle, constructed in accordance with this invention and generally designated 20. Nozzle 20 is shown attached to a hose coupling, generally designated 22, which is connected to a conduit 24 through which dry cement ingredients from a suitable source (not shown) are directed by a blower (not shown) in a manner known in the art. Such material is forced under pressure through conduit 24, hose coupling 22 and into and through nozzle 20. Liquid, usually water, is added to the material by means of a pipe 26 connected into nozzle 20. The dry material and water are intermixed to produce a wet cementitious material which is directed through nozzle 20 and outwardly therefrom onto the desired surface.

Nozzle 20 is composed of a resiliently yieldable elastomeric material, preferably urethane, which is wear and abrasion resistant and sufficiently rigid to accurately guide a stream of material in the intended direction. Nozzle 20 is of a unitary, one-piece construction and can be of any convenient size suitable for a particular application.

Nozzle 20 comprises an elongated hollow body 28 having an inlet end 30 and an outlet end 32. The inlet end of nozzle 20 is generally bell shaped as indicated at 34 and has an inwardly inclined neck portion 36 which merges into the reduced outside diameter portion 38 of nozzle 20. Portion 38 is slightly tapered toward outlet end 32 and is provided with two pairs of diametrically opposed lugs 40 and 42 for facilitating the grasping and handling of nozzle 20. A metal reinforcing ring 44 (FIGS. 4 and 5) can be embedded in bell shaped portion 34, if desired.

Nozzle 20 is provided with an axial bore 46 (FIGS. 3 and 5) having a first portion provided with a cylindrical wall surface 48 adjacent inlet end 30, an elongated intermediate portion in which a thread formation 50 of a double helical configuration is formed in the wall surface thereof, and an outlet portion having a cylindrical wall surface 52. The intermediate portion of bore 46 tapers slightly inwardly from inlet end 30 toward outlet end 32. The helical configuration of bore 46 together with the axial taper thereof constitute important features of this invention, imparting a spiral twist to the cementitious ingredients to provide a consistent and thorough mix and emulsification of such ingredients. The taper of bore 46 maintains control and tends to choke the cementitious mix as it is directed outwardly through nozzle 20 to minimize spreading of such mix.

Portion 34 of nozzle 20 is provided with a threaded opening 54 for receiving hose coupling 22 (FIG. 5). Opening 54 terminates in an end wall 58 which serves as a seat for coupling 22. An annular recess 60 extends axially inwardly of end wall 58, providing a liquid manifold and defining an inner wall portion 62 having an end face 64 lying in a transaxial plane slightly offset axially inwardly from the transaxial plane of end wall 58. End face 64 is beveled to form an inclined shoulder 66 for a reason that will hereinafter become apparent. An annular recess 68 is disposed at the juncture of end wall 58 and the side wall of opening 54 to provide a relief for accommodating radial expansion of the resiliently yieldable material in the area of end wall 58 upon compression of the same by hose coupling 22.

A boss or projection 70 extends radially outwardly from bell-shaped portion 34 of nozzle 20 and is provided with a tapped opening 72 for receiving pipe 26 connected to a suitable source of liquid (not shown). Opening 72 communicates with a passage 74 leading to recess 60. A metal reinforcing ring 45 can be embedded in projection 70.

In use, hose coupling 22 is threaded into opening 54 until the end face 76 of coupling 22 is seated against end wall 58 as shown in FIG. 5. An internal flange or boss 77 projects axially from end face 76 of coupling 22 and has an outer wall surface 78 overlying shoulder 66 and inclined inwardly at an angle corresponding to the angle of inclined shoulder 66. With end face 76 in initial abutting angagement with end wall 58, surface 78 is slightly spaced from shoulder 66 to form an annular passage 80 leading into bore 46. Also, the spacing between end face 76 and face 64 forms an annular communicating passage 82 between 80 and recess 60. Thus, water can be directed radially inwardly into bore 46 via bore 72, passage 74, annular recess 60 and passages 82 and 80.

During the blasting operation, a cement mixture in dry powder form is forced under pneumatic pressure through conduit 24 and hose coupling 22 into bore 46 of nozzle 20. Simultaneously, a liquid, such as water, under pressure is introduced into bore 46 through opening 72, passage 74, recess 60 and passages 80 and 82. The water is mixed with the cement particles passing through bore 46 in portion 48 to form a wet cementitious admixture. Thread formation 50 imparts a spiral twisting or rifling motion to the admixture to thoroughly intermix the ingredients and obtain the proper consistency and density. The rifling motion becomes progressively shallower toward the outlet end 32 and provides a choking action, the result of which is an efficiently controlled stream of cement emulsion directed at a high velocity against a background surface with relatively little rebound and relatively no dust contamination of the ambient atmosphere.

A significant feature of the nozzle of this invention is the water flow control means located at the inlet end of nozzle 20. At the initial stage of the blasting operation, the nozzle operator can thread coupling 22 relative to nozzle 20 in such a manner as to obtain an optimum water flow pattern. If the material issuing from nozzle 20 is too wet, coupling 22 is threaded further into opening 54 to compress end wall 58 thereby decreasing the size of passages 80 and 82 to restrict the flow of water therethrough. If the issuing material is not sufficiently wetted, coupling 22 can be threaded outwardly of opening 54 to enlarge passages 80 and 82 as required. These adjustments are made quickly and easily by the operator who need only rotate coupling 22 with one hand while holding nozzle 20 with the other. The coupling and nozzle are self-locking in adjusted position, being held therein by the resilient reaction of end wall 58. Thus, a sensitive water flow control means is provided to produce a highly controlled cementitious material with very little rebound and dust. It has been found that only about 6 percent of material loss is occasioned by rebound with the nozzle of the present invention as contrasted to a 20–30 percent rebound loss effected by convention nozzles. Although the nozzle of the present invention is preferably used for the pneumatic application of wet cementitious material, it can also be used for dispensing dry materials.

Coupling 22 and nozzle 20 preferably are made of the same material, polyurethane, which material is highly resistant to the abrasive action of the cementitious material passing therethrough, and to the generation of static electricity normally accompanying such passage. However, nozzle 20 can be used with couplings formed of any material, such as metal couplings for example, which are widely used in industrial applications.

With reference to FIG. 4, the foregoing nozzle construction is made by a mold pouring process in the following manner:

An end core member 90 having a central square opening is slip fitted over the square end of a core piece 92. Core piece 92 has an elongated body provided with a double helical rib 94 for forming the thread formation 50 in the finished nozzle 20. Member 90 is provided with external threads 96, a first annular ring 98 and a second annular ring 100 for forming threaded opening 54, recess 60 and relief recess 68, respectively, in the finished product.

A base plate 102 is slipped over a complimentary sized reduced portion 104 of end core member 90 with a locating pin 106 disposed between core member 90 and base plate 102 for properly aligning the same. A nut 108 is threaded onto the threaded end portion 110 of core piece 92. A reinforcing ring 44 is set on base plate 102. Outer mold split sections 112 and 114, having handles 116 and 118, are placed over core piece 92 and spaced therefrom by means of locating pin 120. A slide clamp ring 122 is slipped over the smaller end of assembled sections 112 and 114 and is tightened about the composite outer mold by sliding clamp ring 122 longitudinally along the same. A threaded plug 124 is inserted radially into the enlarged portion of mold section 114 with the free end of plug 124 abutting annular ring 98. Plug 124 forms tapped opening 72 and passage 74 in the finished nozzle 20. A mandrel bushing 125 is placed over core piece 92 between mold sections 112 and 114. A clamp member 126 is placed over the other end of sections 112 and 114 and held in place by a nut 128 threaded onto the threaded end portion 130 of core piece 92.

Prior to assembling the above mold assembly, the parts are coated with a suitable lubricant or mold releasing agent. After the mold is assembled and heated, urethane in plastic pliable form and at the proper durometer is poured into the mold assembly around clamp 126. After pouring, the mold assembly is oven cured at the correct temperature for a given time to enable the urethane material to set. After the material has set, the mold assembly is stripped leaving the finished nozzle 20. After stripping, the nozzle is heat cured.

Reinforcing ring 44 is supported in the mold as by projections engaging plate 102 and threads 96 of member 90, and ring 45 is supported by engagement with plug 124.

FIGS. 6 and 7 illustrate another form of nozzle of the present invention which is very similar to the above described form with the exception that the passages forming the water control means are oriented differently. All of the other structural features and their resultant advantages including the helical threaded formation and the gradual taper of the nozzle fore are duplicated in the form of the invention illustrated in FIGS. 6 and 7 and the same numbers primed are used to identify elements similar to those used in the first form described above.

As shown in FIGS. 6 and 7, passage 74' of nozzle 20' communicates with an annular manifold passage 132 which communicates with a passage 134 extending radially inwardly at an angle to wall surface 48' in the direction of the outlet end of nozzle 20' and opening into bore 46. Passage 132 encircles a sleeve 133 defining passage 134 at one end and seat 58' at the other, which sleeve is joined to nozzle portion 34' by a hinge portion 135. The opening provided by passage 134 can be varied as required or desired by threading hose coupling 22 into opening 54' with coupling 22 in abutting relation with seat 58' of nozzle 120. The urethane material of hinge 135 will yield resiliently under compression to vary the size of passage 134. An annular relief recess 68' is provided around seat 58' to further define hinge 135 and to accommodate the expansion of material in the area of seat 58'.

Passages 132 and 134 are formed in nozzle 20' during the molding thereof by employing a cup-shaped annular member 136 formed of a eutectic metal. As shown in FIG. 7, member 136 is inserted in an annular groove 138 provided about the periphery of end core member 90' with plug 124' engaging the outer annular wall portion of member 136. Although the mold assembly depicted in FIG. 7 differs somewhat from the mold assembly described in connection with the forming of nozzle 20, the variations are slight and the operation thereof obvious in view of the foregoing whereby it is believed that no detailed description or amplification is necessary, the important factor being that member 136 is positioned in the mold assembly prior to the pouring operation.

After the urethane material has been poured and partially set, the mold assembly is stripped. After end core member 90' and plug 124' have been removed from the mold assembly, the lip portion of member 136, i.e., that portion which was disposed in annular groove 138, is removed by means of a ream cutter so that core piece 92' can be screwed leftwardly out of the mold assembly. Nozzle 20' with member 136 embedded therein is then placed in an oven and heated to 270° F. for a few minutes to melt member 136. The melted alloy flows outwardly through passage 74' and a fitting inserted in bore 72'. Nozzle 20' is then placed in an oven for final curing.

FIG. 8 illustrates a third form of nozzle of this invention and comprises a two-piece composite nozzle 20" preferably formed of urethane and consisting of an outer shell 140 having an outer configuration similar to the above described nozzles. Shell 140 is provided with a boss 142 having a tapped opening 144 communicating with a passage 146 extending through the wall of shell 140. Shell 140 is provided with a bore 148 having a double helical thread formation 150 therein similar to the threaded bores of the outer nozzles previously described.

An insert 152, preferably also formed of urethane, is fitted into the inlet end of shell 140 and has a shoulder 154 in abutting engagement with an annular shoulder 156 provided adjacent the inlet end of shell 140. Insert 152 has an outer peripheral surface conforming to the inner wall surface of shell 140 adjacent its inlet end and secured thereto by a suitable adhesive 158. A metal reinforcing ring 160 is embedded in shell 140 and serves to reinforce and rigidify the inlet end of nozzle 20". A reinforcing ring 145 is embedded in boss 142.

Insert 152 is provided with an opening 162 defined by a threaded wall portion 164 and terminating in an end face 166 which serves as the seat for hose coupling 22. An annular recess 168 is provided at the juncture of wall portion 164 and end face 166 for the purpose of accommodating material expansion during the compression of insert 152 by means of a hose coupling threaded into opening 162 and to further define a hinge section 167 corresponding to hinge 135 of FIG. 6. A bore 170 is provided in insert 152 and has approximately the same diameter as bore 148. Insert 152 has a tapered inner end portion 172 conforming generally to the taper of an inclined shoulder 174 provided on the inner wall surface of shell 140. The spacing between portion 172 and shoulder 174, which overlap, defines a passage 176 opening into bore 148 and communicating with a manifold passage 178 connected to passage 146. Thus, water or other suitable liquid is directed into bore 148 via opening 144, passage 146 and passages 178 and 176. The rate of flow can be controlled by adjusting the size of passage 176 which is accomplished by threading a hose coupling 22 in opening 162 against seat 166, the hinge 167 resiliently yielding to permit end portion 172 to move toward shoulder 174.

A fourth form of nozzle of this invention is disclosed in FIG. 9 and is similar in its use of an insert to the form shown in FIG. 8. However, the water flow passages are differently oriented. The other structural features are identical and will be identified by the same numbers primed used to identify corresponding structure in the form of the invention shown in FIG. 8.

As shown in FIG. 9, the inner end of insert 152' terminates in a flat face 180 normally slightly spaced axially from a flat, annular shoulder 182 provided on shell 140' to define a passage 184 therebetween extending radially inwardly normal to wall surface 148' of shell 140'. Passage 184 communicates with a manifold passage 178' leading to a suitable source of liquid (not shown) via passages 146' and opening 144'. The rate of water flow is adjusted by varying the opening of passage 184 by moving insert 152' axially relative to shell 140' through the threaded connection of a hose coupling 22 with opening 162'. The resilient material of the nozzle adjacent shoulder 158' yields to accommodate this.

It should be noted that all forms of nozzles heretofore described have a common bore 46 extending therethrough as shown in FIG. 10. Thread formation 50 which effects a rifling action of the mix is defined by a forward or leading wall 51 substantially normal to the flat, recessed inner wall 55 and a generally inclined rearward or trailing wall 53. Although a thread formation of a double helical configuration is preferred, it should be understood that a single helical thread formation can be used, if desired, and arranged at any suitable pitch within the purview of this invention. Likewise, the walls defining recesses 55 can be oriented at any desired angle relative to the longitudinal axis of bore 46. It will be noted that the height of the thread, i.e. the distance from recessed surface 55 to land surface 57 progressively diminishes in the direction of taper.

Still another form of nozzle assembly of this invention is shown in FIGS. 11-14 and comprises a separate nozzle, generally designated 200, attached to a liquid injection adaptor, generally designated 202 (FIG. 11), both of which preferably are formed of urethane.

Nozzle 200 comprises an elongated, hollow body 204 having an axial bore 206 therethrough, and an inlet end 208 and an outlet end 210. Bore 206 is provided with a thread formation 212 of a double helical pattern. Although each incremental width of the teeth defining thread formation 212 flares outwardly, the thread formation becomes progressively shallower toward outlet end 210 to gradually constrict bore 206 for a reason that will hereinafter become apparent. The outside diameter of body 204 also tapers slightly from inlet end 208 to outlet end 210. Two pair of diametrically opposed lugs 214 are provided on the outer surface of body 204 for facilitating the handling and manipulation of nozzle 200. Inlet end 208 is provided with an externally threaded portion 216 for receiving adaptor 202 thereon.

Adaptor 202 comprises a generally cylindrical body 220 having a bore 222 and an enlarged diameter internally threaded opening 224 for receiving a suitable hose coupling, such as identified in FIG. 1 as 22. A boss 226 extends radially outwardly from body 220 and is provided with a tapped opening 228 communicating with a radial passage 230 connected to an annular recess 232 formed in body 220 and defining a sleeve or collar-like wall 234. The inner axial end of wall 234 is provided with a circular shoulder or seat 236 having a series of projections in the form of teeth 238 extending circumferentially thereabout and inclined relative to the transaxial plane of adaptor 202. A threaded opening 240 is provided at the outlet end of adaptor 202 for receiving threaded portion 216 of nozzle 200. A pair of axially spaced metal rings 242 are provided in body 220 to reinforce and rigidify the same. A ring 245 is provided in boss 226.

In use, nozzle 200 is threaded into adaptor 202 until the inlet end face 208 of nozzle 200 engages seat 236. A suitable conduit or hose is connected into threaded opening 224 for conveying dry cement ingredients in powder form into adaptor 202. A suitable coupling is threaded into opening 228 for connecting adaptor 202 to a suitable source of liquid under pressure. The dry cement mixture is mixed with water introduced into adaptor 202 via opening 228, passage 230, recess 232 and the passages defined by teeth 238 to form a wet cementitious admixture. Thread formation 212 imparts a spiral twisting or rifling motion to the admixture as it is forced under pressure through nozzle 200. This rifling action coupled with the choking action caused by the thread formation becoming shallower toward the outlet end of nozzle 200 results in a highly controlled delivery of the wet cementitious material with very little rebound and dust.

In order to control the water flow rate for obtaining the optimum mix density and consistency, the operator need only thread adaptor 202 axially relative to nozzle 200 to bring seal 236 into engagement with the inlet end face 208 of nozzle 200 with varying degrees of compression. Because of the resiliency of the material of which adaptor 202 is formed, teeth 238 will flex and yield resiliently under compression and the passages therebetween will correspondingly vary in size to control the rate of water flow therethrough.

Although teeth 238 are preferably inclined to the transaxial plane of nozzle 200 to provide a very sensitive control, it should be understood that teeth 238 can be of square formation. Although nozzle 200 and water injection adaptor 202 are preferably formed of urethane, any suitable resiliently yieldable material of sufficient durometer and density, can be used in lieu of urethane, if desired. Of course, nozzle 200 can be used to convey dry material, if desired.

It should be appreciated that liquid injection adaptor 202 can be used independently with other conventional nozzles, if desired. Likewise, nozzle 200 is not restricted in use with adaptor 202 but has utility with any suitable liquid injection adaptor or head.

FIG. 12 illustrates the mold assembly used in forming nozzle 200, such mold assembly comprising a pair of split mold sections 250 and 252, an end plate 254 having a central opening therein for receiving the reduced diameter end portion 256 of a core piece 258, to which it is soldered. Core piece 258 is provided with a spiral rib formation 260 preferably of a double helix pattern formed about the periphery of core piece 258 to impart the desired thread formation to the finished nozzle. A mandrel sleeve 262 is slipped over a cylindrical portion of core piece 258 and is held in place by a clamp member 264 also encircling the cylindrical portion of core piece 258. A wing screw 266 is threaded into the end face of core piece 258 to clamp and secure the assembly together. A pair of handles 268 and 270 are secured to mold sections 250 and 252 for facilitating the handling of the mold assembly.

It should be noted that thread formation 212 of nozzle 200 varies in configuration from that of the thread formation of the previously described nozzles. The specific thread shape and pitch can vary with each nozzle within the purview of this invention as dictated by the economics of design and the particular application of the nozzle.

From the foregoing, it is apparent that the objects of the present invention have been fully accomplished. As a result of this invention, an improved cement gun nozzle is provided for producing a highly controlled delivery with very little rebound and dust. By the provision of a spiral or helical thread formation in the bore of the nozzle, a spiral twist or rifling motion is imparted to the cementitious mixture. By gradually tapering the bore toward its outlet end, a choking action is effected to minimize spreading of the ingredients issuing from the nozzle. By forming the nozzle of a plastic resiliently yieldable material such as urethane, the necessity of grounding the nozzle is eliminated and the useful life of the nozzle is extended by the wear and abrasion resistance of such material. Also, the nozzle is of a lightweight construction, easy to manufacture and convenient to handle during use. Because of the resiliency of the material of which the nozzle is formed, the sizes of the liquid flow passages leading to the bore of the nozzle can be easily varied by merely adjustably threading a hose coupling or a liquid injecting head into or out of the nozzle inlet. The liquid flow control feature and the rifling action resulting from the spiral thread formation insures a thorough mix of the ingredients with the liquid to produce a mix of optimum density and consistency.

Preferred embodiments of this invention having been described in detail, it is to be understood that this has been done by way of illustration only.

The claims:

1. An adaptor comprising: a body formed of a resiliently yieldable plastic material having a bore therethrough, a threaded opening communicating with said bore, said opening having a diameter larger than said bore to define an annular seat therebetween, said seat being provided with means defining a series of passages communicating with said bore, an annular manifold passage spaced radially outwardly of said bore communicating with said series of passages, and an inlet passage communicating with said annular manifold passage, said means defining said passages comprising a plurality of projections compressible for varying the size of said passages.

2. An adaptor according to claim 1, wherein said resiliently yieldable plastic material is urethane.

3. An adaptor according to claim 1, including a second threaded opening in axially spaced relation to said first threaded opening and communicating with said bore for defining an outlet therefor engagable with a nozzle.

4. An adaptor according to claim 1, including metallic means imbedded in said body for reinforcing the same.

5. An adaptor comprising: a body formed of a resiliently yieldable plastic material having a bore therethrough, a threaded opening communicating with said bore, said opening having a diameter larger than said bore to define an annular seat there-between, said seat being provided with means defining a series of passages communicating with said bore, an annular manifold passage spaced radially outwardly of said bore communicating with said series of passages, and an inlet passage communicating with said annular manifold passage, said passages defining means comprising a plurality of teeth each lying in an inclined plane whereby deflection of said teeth varies the size of said passages.

6. An adaptor according to claim 5, wherein said resiliently yieldable plastic material is urethane.

* * * * *